(12) United States Patent
Curtis et al.

(10) Patent No.: US 10,811,009 B2
(45) Date of Patent: Oct. 20, 2020

(54) AUTOMATIC SKILL ROUTING IN CONVERSATIONAL COMPUTING FRAMEWORKS

(71) Applicant: International Business Machines Corporation, Armonk, NY (US)

(72) Inventors: Bryce A. Curtis, Round Rock, TX (US); Stewart Nickolas, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 16/019,727

(22) Filed: Jun. 27, 2018

(65) Prior Publication Data

US 2020/0005776 A1   Jan. 2, 2020

(51) Int. Cl.
*G10L 15/22* (2006.01)
*G10L 15/06* (2013.01)
*G10L 15/30* (2013.01)

(52) U.S. Cl.
CPC ............ *G10L 15/22* (2013.01); *G10L 15/063* (2013.01); *G10L 15/30* (2013.01); *G10L 2015/0635* (2013.01); *G10L 2015/223* (2013.01)

(58) Field of Classification Search
None
See application file for complete search history.

(56) References Cited

U.S. PATENT DOCUMENTS

| 5,937,380 | A  | * | 8/1999 | Segan | G10L 15/22 704/235 |
| 6,584,439 | B1 | * | 6/2003 | Geilhufe | G06F 3/167 704/270 |
| 6,901,431 | B1 | * | 5/2005 | Dodrill | H04L 69/329 709/207 |
| 7,729,916 | B2 |   | 6/2010 | Coffman et al. | |
| 8,082,153 | B2 |   | 12/2011 | Coffman et al. | |
| 8,438,031 | B2 |   | 5/2013 | Ross et al. | |
| 8,666,980 | B1 |   | 3/2014 | Vora | |
| 9,472,196 | B1 | * | 10/2016 | Wang | G06F 3/167 |

(Continued)

OTHER PUBLICATIONS

Ram, A., Prasad, R., Khatri, C. et al. (2018). Conversational AI: The Science Behind the Alexa Prize. arXiv preprint arXiv:1801.03604.

(Continued)

*Primary Examiner* — Thuykhanh Le
(74) *Attorney, Agent, or Firm* — Garg Law Firm, PLLC; Rakesh Garg; Alexander Jochym (57) ABSTRACT

An utterance is analyzed to identify an absence of a known invocation phrase. A skill set is constructed in response to the absence, the skill set including a first skill corresponding to the utterance and a first skill score corresponding to a likelihood that the first skill corresponds to the utterance. The first skill score is adjusted, based on the presence of the first skill in a skill history, where the skill history stores a set of history skills in an order of recency of use of each history skill in the set of history skills. The first skill score is adjusted, based on an association of the first skill with a default installed skill. An installed skill is selected, based on the adjusted first skill score, the installed skill performing an action in response to the utterance.

20 Claims, 5 Drawing Sheets

(56) References Cited

U.S. PATENT DOCUMENTS

| | | | |
|---|---|---|---|
| 9,875,740 B1 | 1/2018 | Kumar et al. | |
| 2003/0182131 A1* | 9/2003 | Arnold | G10L 15/32 704/275 |
| 2008/0235031 A1* | 9/2008 | Yamamoto | G10L 15/26 704/275 |
| 2008/0306740 A1* | 12/2008 | Schuck | G06Q 50/22 704/275 |
| 2010/0036667 A1* | 2/2010 | Byford | G06F 3/167 704/270 |
| 2010/0138224 A1* | 6/2010 | Bedingfield, Sr. | G10L 15/22 704/275 |
| 2012/0016678 A1* | 1/2012 | Gruber | G10L 15/22 704/275 |
| 2012/0022874 A1* | 1/2012 | Lloyd | G10L 15/19 704/275 |
| 2013/0080177 A1* | 3/2013 | Chen | G10L 15/26 704/275 |
| 2014/0122090 A1* | 5/2014 | Park | G06F 3/167 704/275 |
| 2014/0288932 A1* | 9/2014 | Yeracaris | G10L 15/30 704/249 |
| 2014/0343950 A1* | 11/2014 | Simpson | G10L 15/22 704/275 |
| 2015/0302856 A1* | 10/2015 | Kim | G10L 15/22 704/273 |
| 2015/0310864 A1* | 10/2015 | Li | G10L 15/1822 704/235 |
| 2015/0348551 A1* | 12/2015 | Gruber | G10L 15/28 704/235 |
| 2016/0042735 A1* | 2/2016 | Vibbert | G10L 15/222 704/257 |
| 2017/0228366 A1 | 8/2017 | Bui et al. | |
| 2018/0108351 A1* | 4/2018 | Beckhardt | G10L 15/32 |
| 2018/0330727 A1* | 11/2018 | Tulli | G10L 15/22 |
| 2019/0013019 A1* | 1/2019 | Lawrence | G10L 15/22 |
| 2019/0147850 A1* | 5/2019 | Almudafar-Depeyrot | G10L 15/18 704/257 |
| 2019/0155566 A1* | 5/2019 | Dory | G10L 15/22 |
| 2019/0172452 A1* | 6/2019 | Smith | G10L 15/22 |

OTHER PUBLICATIONS

López, G., Quesada, L., & Guerrero, L. A. (2017). Alexa vs. Siri vs. Cortana vs. Google Assistant: a comparison of speech-based natural user interfaces. International Conference on Applied Human Factors and Ergonomics, pp. 241-250.

* cited by examiner

AUTOMATIC SKILL ROUTING IN CONVERSATIONAL COMPUTING FRAMEWORKS

TECHNICAL FIELD

The present invention relates generally to a method, system, and computer program product for human-machine interface. More particularly, the present invention relates to a method, system, and computer program product for automatic skill routing in conversational computing frameworks.

BACKGROUND

Conversational computing is a style of human-computer interaction in which users may interact with computer programs through verbal commands and responses. For example, digital assistant programs such as IBM's Watson Assistant, Amazon's Alexa, Microsoft's Cortana, Google's Assistant, and Apple's Siri use conversational computing frameworks to respond to voice commands to handle various tasks. (IBM and IBM Watson are trademarks of International Business Machines Corporation in the United States and in other countries. Alexa is a trademark of Amazon.com, Inc. or its affiliates in the United States and in other countries. Cortana is a trademark of Microsoft Corporation in the United States and in other countries. Google Assistant is a trademark of Google Inc. in the United States and in other countries. Siri is a trademark of Apple Inc. in the United States and in other countries.)

SUMMARY

The illustrative embodiments provide a method, system, and computer program product. An embodiment includes a method that analyzes an utterance to identify an absence of a known invocation phrase. The embodiment uses a processor and a memory to construct, in response to the absence, a skill set, the skill set including a first skill corresponding to the utterance and a first skill score corresponding to a likelihood that the first skill corresponds to the utterance. The embodiment adjusts, based on the presence of the first skill in a skill history, the first skill score, where the skill history stores a set of history skills in an order of recency of use of each history skill in the set of history skills. The embodiment adjusts, based on an association of the first skill with a default installed skill, the first skill score. The embodiment selects, based on the adjusted first skill score, an installed skill, wherein the installed skill performs an action in response to the utterance.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Conversational computing frameworks typically include support for a library of skills, where each skill is a module that includes an associated vocabulary and some computer-implemented functionality based on that vocabulary. For example, a clock skill might include vocabulary enabling the skill to recognize voice commands such as "what time is it?" and the functionality to search for current time and respond to the user with the current time. Presently, the skills are typically limited in scope; if a skill attempts to recognize too many commands, either too much command ambiguity results or the vocabulary required is too large to process while remaining responsive to a user.

To begin interacting with a conversational framework, a user generally must say a device activation phrase to wake up the device and tell it to start listening. For example, one device's device activation phrase is "Hey, Siri", while another's is "Alexa".

To begin interacting with a skill installed in a conversational framework, a user generally must say a phrase. The phrase acts as a command, causing the skill to perform an action. Often, a skill also requires an invocation phrase which activates the skill, causing it to listen for further commands. For example, one skill's invocation phrase is "Ask Wikipedia". Thus, an example of an phrase for one installed skill is, "Ask Wikipedia to tell me about Mars."

Current conversational frameworks allow developers to write skills that can be added to a user's environment, expanding the framework's capabilities. For example, one conversational framework supports a dashboard. Using the dashboard, users can install pre-built skills appropriate to their particular environment—for example, to turn lights on or off—and specify a phrase to activate the skill. In addition, developers may create new skills for users to use, including a Uniform Resource Locator (URL) or other endpoint address to service the new skills. Other platforms support similar functionality.

As a result, a typical conversational framework could include skills with different invocation phrases. For example, a conversational framework might have skills installed that respond to, "Add eggs to my grocery list in MyListApp" as well as, "Ask Wikipedia to tell me about Mars." Here, a skill that responds to "MyListApp" will handle the grocery list request while a Wikipedia skill will handle the Mars request. However, such a framework requires that users say the invocation phrase each time they interact with a skill, which limits natural interaction.

When interacting with a conversational framework that includes skills with different invocation phrases, users have to speak, provide, or otherwise input the invocation phrase to switch context to a new skill. For example, to get the time and then the weather, a user would have to say, "Ask clock, what time is it in Armonk?" and then, "Ask weather, what's the temperature in Armonk?" However, users would prefer not to repeat each skill's invocation phrase each time they interact with a skill, because this necessity limits natural interaction and annoys users. Instead, continuing the above example a user would prefer to say, "What time is it in Armonk?" then "What's the temperature in Armonk?" omitting the invocation phrases. Accordingly, users need a way to interact with a conversational framework without repeating each skill's invocation phrase each time they interact with a skill.

The illustrative embodiments recognize that the presently available tools or solutions do not address these needs or provide adequate solutions for these needs. The illustrative embodiments used to describe the invention generally address and solve the above-described problems and other problems related to automatic skill routing in conversational computing frameworks.

An embodiment can be implemented as a software application. The application implementing an embodiment can be configured as a modification of an existing conversational computing framework system, as a separate application that operates in conjunction with an existing conversational computing framework system, a standalone application, or some combination thereof.

Particularly, some illustrative embodiments provide a method by which user utterances can be routed to skills automatically, without the use of an invocation phrase.

In conversational frameworks, each skill comprises a list of utterances, each mapping to an intent, optional slot(s), and an action.

An "utterance" is a phrase. While a user typically speaks an utterance, other input methods, such as typing into a chat application or text supplied from a speech-to-text application, are also possible. An "intent" is something the user wants to accomplish from the utterance. Once a device implementing a conversational framework detects an utterance, the device maps the utterance to an intent. For example, the utterance, "What time is it?" might map to an intent of "get time", where "get time" is an example conversational framework's intent meaning that user wants the current time.

Multiple utterances may map to one intent. For example, the utterances, "Tell me the time", "Get time", and "What time is it?" could all map to the "get time" intent in an example conversational framework.

A "slot" is a placeholder or variable, having a value, extracted from an utterance. For example, for the utterance, "set a timer for ten minutes from now", the intent could be "set a timer" and the slot value could be "ten minutes from now". As another example, given the utterance, "tell me about Mars," the intent could be "tell me" and the slot value could be "about Mars".

Some slot values may be implemented as enumerated entities. For example, IBM's Watson Assistant includes enumerated entities such as companies and other names. As a result, if a user asks about, for example, IBM, Watson Assistant recognizes "IBM" as an entity and can provide additional information based on this knowledge.

An "action" is code that executes to perform a request denoted by a particular intent and slot value. For example, for the utterance, "set a timer for ten minutes from now", the action could be to set a timer that expires ten minutes after the current time and report this back to the user. An action may be simple, such as setting a timer, or more complex, such as triggering a piece of business logic to perform a task.

A skill assistant application in accordance with an illustrative embodiment includes one or more installed skills, each including one or more skill utterances. The skill assistant application receives user utterances and routes them to appropriate installed skills for further handling. Skill utterances may be stored using any suitable storage. In a non-limiting example, skill utterances are stored in an elastic search engine. The stored set of skill utterances includes all the utterances recognized by all installed skills.

Each installed skill typically includes an invocation phrase to invoke that particular skill. For example, if "Ask Wikipedia" is an invocation phrase to invoke the Wikipedia skill, a user could say "Ask Wikipedia <phrase>" to obtain information about <phrase> from the Wikipedia skill. This is a non-limiting example, and any invocation phrase, in any language, can be associated with any installed skill. Further, an installed skill can be configured to not require an invocation phrase.

In accordance with an illustrative embodiment, each installed skill with an invocation phrase can be configured to always require a user to say the invocation phrase. Alternatively, each installed skill with an invocation phrase can be configured to not require a user to say the invocation phrase. In such a case, a skill assistant application in accordance with an illustrative embodiment can route a user's utterance to an appropriate skill.

When the skill assistant application receives an utterance, the application first analyzes the utterance to determine if the utterance includes a known invocation phrase. Because the skill assistant application already knows which invocation phrases correspond to which installed skills, the application can send utterances with known invocation phrases directly to the appropriate installed skill, without additional processing. For example, if "Ask Wikipedia" is a known invocation phrase, "Ask Wikipedia <phrase>" would direct <phrase> directly to the Wikipedia skill.

If the skill assistant application determines that the utterance does not include a known invocation phrase, the application routes the utterance to a phrase scoring module. Referencing the stored list of skill utterances, the phrase scoring module constructs a set of skills and corresponding scores. Each skill-score pair in the set denotes a skill that could correspond to the user's utterance and the likelihood that that skill does indeed correspond to the user's utterance. Scores can be calculated using, in non-limiting examples, natural language processing algorithms such as key word matchers, stemmers, n-grams, and other techniques. The set of skills and scores typically includes the ten or twenty most likely possibilities, sorted from highest to lowest score, although these are non-limiting examples. Other set sizes, sorting orders, and storage arrangements are included within the scope of the illustrative embodiments.

A score modification module receives the set of skills and corresponding scores from the phrase scoring module and optionally adjusts one or more of the scores. For example, scores can be adjusted based on recently-used skills, or to accommodate a default installed skill.

Score adjustment based on skill history helps to resolve skill ambiguities, based on the reasoning that one of the skills a user has recently interacted with, or the skill a user was most recently interacting with is likely the skill a user still means to interact with. An utterance might be equally relevant to two skills. For example, "What time is it in Armonk?" could be handled by either an installed clock skill that handles time queries, or an installed map skill that knows where Armonk is. However, in this example, if the user had just been interacting with the clock skill, the clock skill may be more likely to be able to handle this new query and should do so. On the other hand, an example utterance, "Where is Armonk?" could be much more appropriately handled by an installed map skill, even if the user had just been interacting with a clock skill. In this case, although score modification might raise the score for the clock skill, the map skill would still be have been scored higher before score adjustment and would retain that higher score.

In accordance with an illustrative embodiment, a skill assistant application raises scores for skills that match skills in the skill history. In accordance with an illustrative embodiment, a skill assistant application adjusts scores with reference to only the most recent skill, or with reference to some or all of most recent skills stored in a skill history. A skill assistant application also adjusts scores with reference to the location of a skill within the skill history, or without taking location of a skill within the skill history into account. For example, an application raises a score for a skill by an amount corresponding to a location of the matching history skill in the skill history. In this case, a skill matching the most recently used history skill would be raised by an amount, while skills matching less recently used history skills would be raised by correspondingly smaller amounts.

In an illustrative embodiment, score adjustment amounts are chosen to obtain desired score routing behavior. For example, in accordance with an illustrative embodiment the score for a skill matching the most recently used history skill would be raised by 25 percent, the score for a skill matching the second most recently used history skill would be raised by 22.5 percent, and scores for skills matching less recently used history skills would be raised by correspondingly smaller amounts.

In addition, a particular installed skill may be implemented as the default skill, in accordance with an illustrative embodiment. If no skill receives a minimum score for routing to a particular installed skill, it is likely that the user said something ambiguous that should be handled by a skill with the ability to handle such a situation. For example, the default skill might respond with a phrase such as, "I'm sorry, I didn't understand that. Would you like help?" Such an example default skill can also recognize other utterances, such as "help" and "menu".

Thus, in accordance with an illustrative embodiment, if a skill is associated with a default installed skill, the application adjusts the score for that skill. For example, the application raises the score by an amount chosen to ensure that the skill is routed to the default installed skill instead of to an installed skill that may be less appropriate. However, such a score should not be raised so much as to override a much-more-likely skill associated with a different installed skill. For example, if a skill score matching the mostly recently used skill is raised by 25 percent, as discussed herein, the score for a skill associated with the default installed skill could be raised by 24.75 percent.

These examples of score adjustment are not intended to be limiting. From this disclosure, those of ordinary skill in the art will be able to conceive many other score modifications and their values, and the same are contemplated within the scope of the illustrative embodiments. In particular, scores can be adjusted based on factors other than recently-used skills or to accommodate a default installed skill. For example, scores can be adjusted based on phrases, key words, or entities stored in a history. Storing such information allows a skill assistant application to infer a user's meaning from previously-used utterances, improving conversational flow between the user and the conversational framework. For example, by saving entities, a user could say, "Where is Armonk?", get an answer, and then say, "What time is it there?" without having to further explain "there". As another example, storing phrases, key words, and previous skill routing information allows a skill assistant application to learn from previous interactions with a user to improve utterance recognition over time.

After any appropriate score adjustment, the application selects a skill-score pair corresponding to an installed skill. For example, if a skill in a skill-score pair matches a skill stored in the skill history and the score is also above a threshold, that skill-score pair could be selected. As a further example, if the skills stored in the skill history are stored in order of recency of use, searching for a match can start with the most recently-used skill. A skill the user has used recently, or just used, is likely to be one the user wants again, and starting with the most recently-used skill can improve efficiency. Further, requiring a score to be above a threshold helps ensure a correspondence within a reasonable likelihood that the selected skill can actually handle the user's utterance. As a non-limiting example, such a threshold can be set to 75% of the maximum score available in the application, although higher and lower thresholds are also possible.

In an illustrative embodiment, an application has the option to set one or more installed skills to require an invocation phrase every time these skills are used. If the user does not say the invocation phrase, the application will generally not route the user's utterance to these installed skills. However, in a further refinement, if a skill-score pair that requires an invocation phrase matches the most recently-used skill stored in the skill history, an illustrative embodiment can be configured to select that installed skill even though the user did not use the invocation phrase. Such skills may be tagged with a special tag, e.g., 'requiresInvocation' tag, when installed.

If no skill in a skill-score pair matches a skill stored in the skill history and the score is also above a threshold, the application selects the skill-score pair with the highest score. Here too, requiring a score to be above a threshold helps ensure a correspondence within a reasonable likelihood that the selected skill can actually handle the user's utterance. As a non-limiting example, such a threshold can be set to 75% of the maximum score available in the application, although higher and lower thresholds are also possible.

If no skill in a skill-score pair matches a skill stored in the skill history and no score is above a threshold, the application selects the default installed skill. With no score exceeding the threshold, it is unlikely that any installed skill corresponds to the utterance, and the default skill handler should handle the situation by asking the user for clarification or further information.

Once an installed skill is selected, the application routes the utterance to that skill for handling. The selected installed skill's conversation engine maps the user's phrase to an intent, optional slot(s), and action, then calls appropriate action code. After the action is executed, the selected installed skill is saved into the "Skill History".

The manner of automatic skill routing in conversational computing frameworks described herein is unavailable in the presently available methods. A method of an embodiment described herein, when implemented to execute on a device or data processing system, comprises substantial advancement of the functionality of that device or data processing system in performing automatic skill routing in conversational computing frameworks.

The illustrative embodiments are described with respect to certain types of conversational frameworks, utterances, invocation phrases, skills, intents, slots, actions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
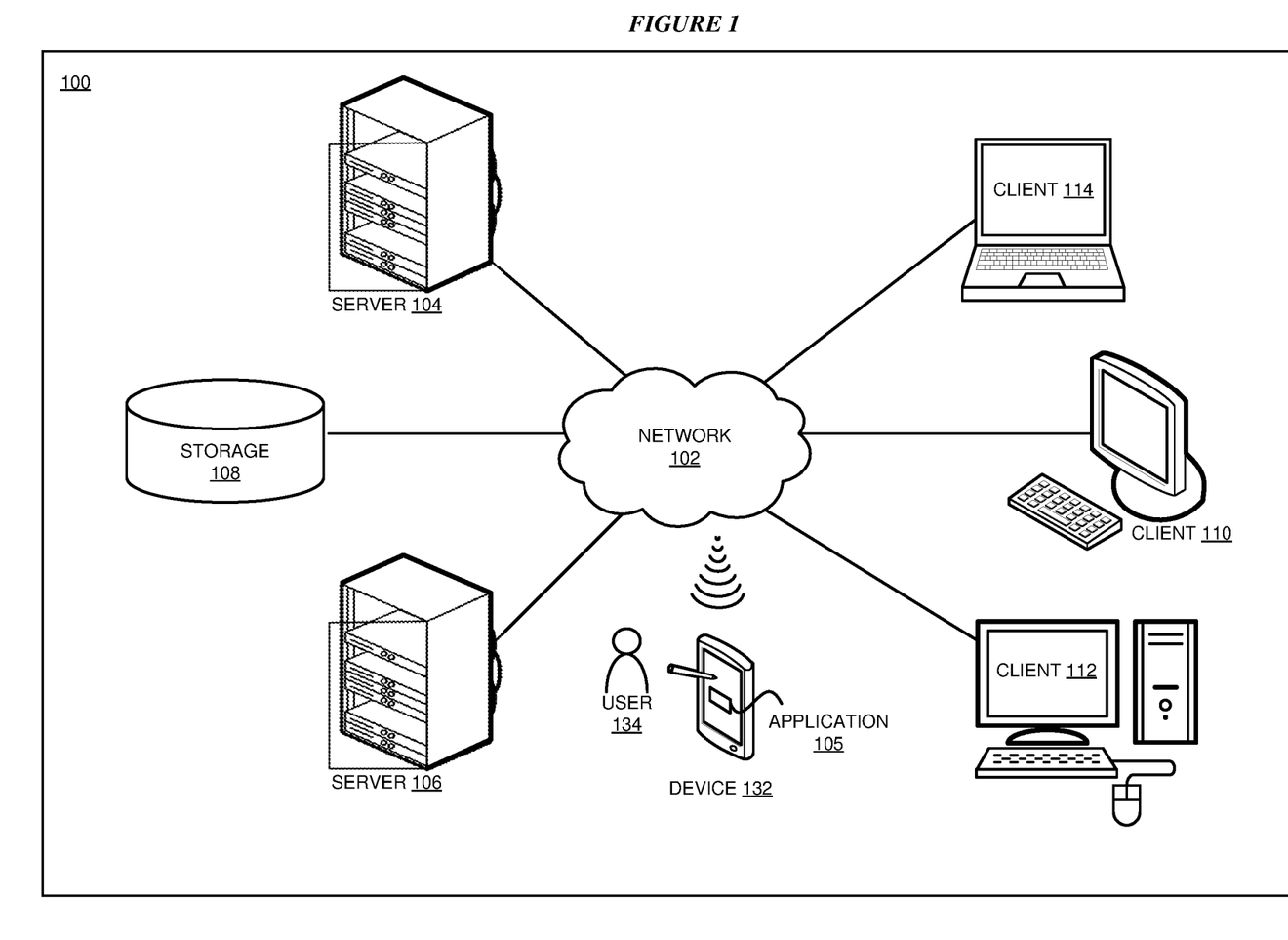
FIG. 1 depicts a block diagram of a network of data processing systems in which illustrative embodiments may be implemented.
Figure 2:
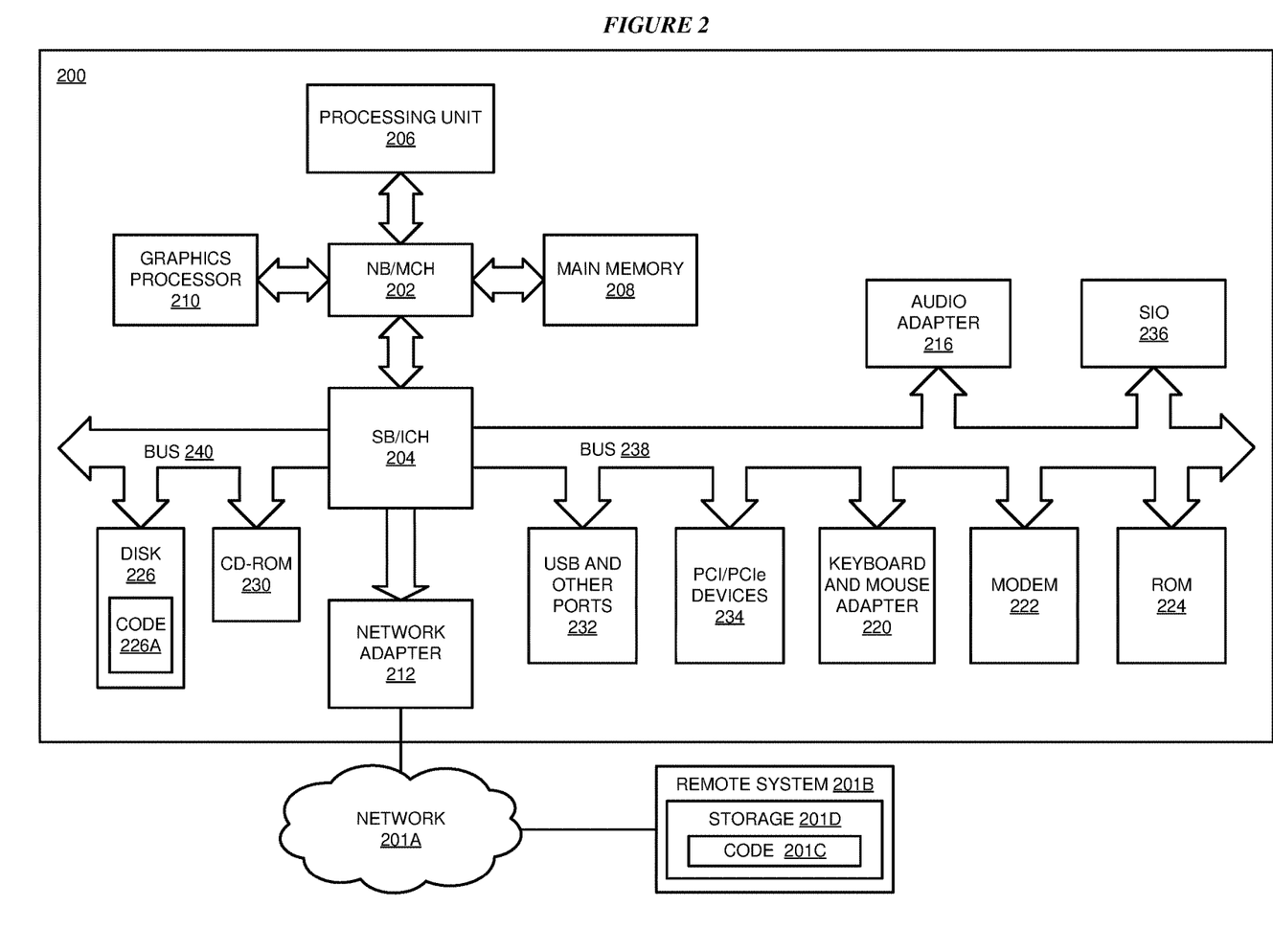
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of smart speaker system, a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. The placement of application 105 at device 132 is not intended to be limiting. Within the scope of the illustrative embodiments, application 105 can be adapted to operate or execute on device 132, any of clients 110, 112, and 114, or servers 104 and 106. As an example, user 134 may interact with application 105 via device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a smart speaker or personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, smart speaker, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
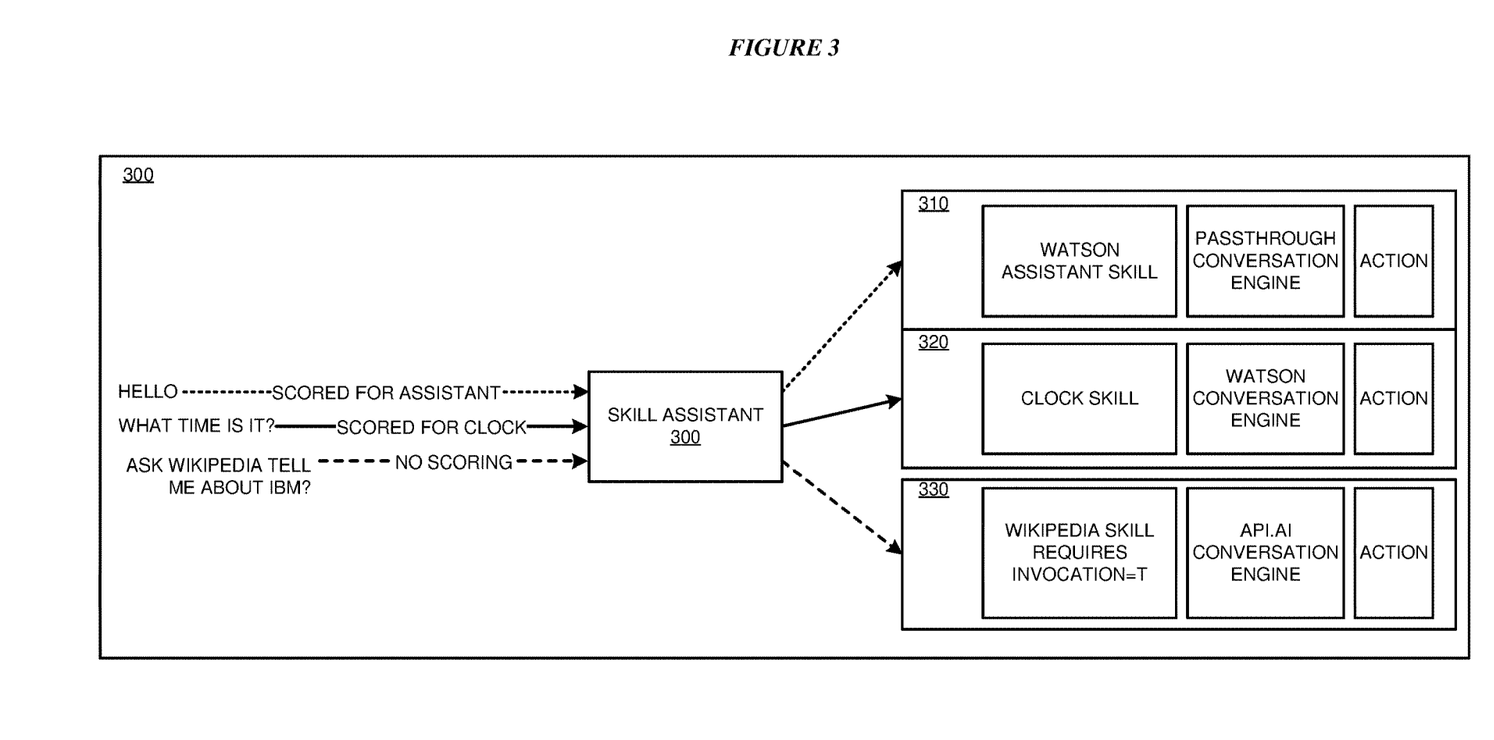
FIG. 3 depicts a an example configuration for automatic skill routing in conversational computing frameworks in accordance with an illustrative embodiment.

With reference to FIG. 3, this figure depicts a an example configuration for automatic skill routing in conversational computing frameworks in accordance with an illustrative embodiment. Skill assistant application 300 is an example of application 105 in FIG. 1. FIG. 3 depicts three example inputs being processed by skill assistant application 300. Skill assistant application 300 routes each example input to a different exemplary installed skill.

In particular, in the non-limiting examples shown, skill assistant application 300 routes the phrase "Hello" to skill 310, which is configured as the default skill to handle phrases that are not handled by the other installed skills. Skill 310 includes a passthrough conversation engine to map the user's phrase to an intent, optional slot(s), and action. Here, skill 310 will respond to the phrase "Hello" by engaging the user in further conversation. Skill assistant application 300 routes the phrase "What time is it?" to skill 320, the clock skill, which is configured to handle time-related tasks. Skill 320 includes a conversation engine to map the user's phrase to an intent, optional slot(s), and action. Here, skill 320 will respond to the phrase "What time is it?" by telling the user the current time. Skill assistant application 300 routes the phrase "Ask Wikipedia to tell me about <entity>" to skill 330, which is configured to respond to tasks involving information from the Wikipedia online reference repository. Skill 330 includes a conversation engine to map the user's phrase to an intent, optional slot(s), and action. Here, skill 330 will respond to the phrase "Ask <reference repository> to tell me about <entity>" by telling the user about <entity>.

Figure 4:
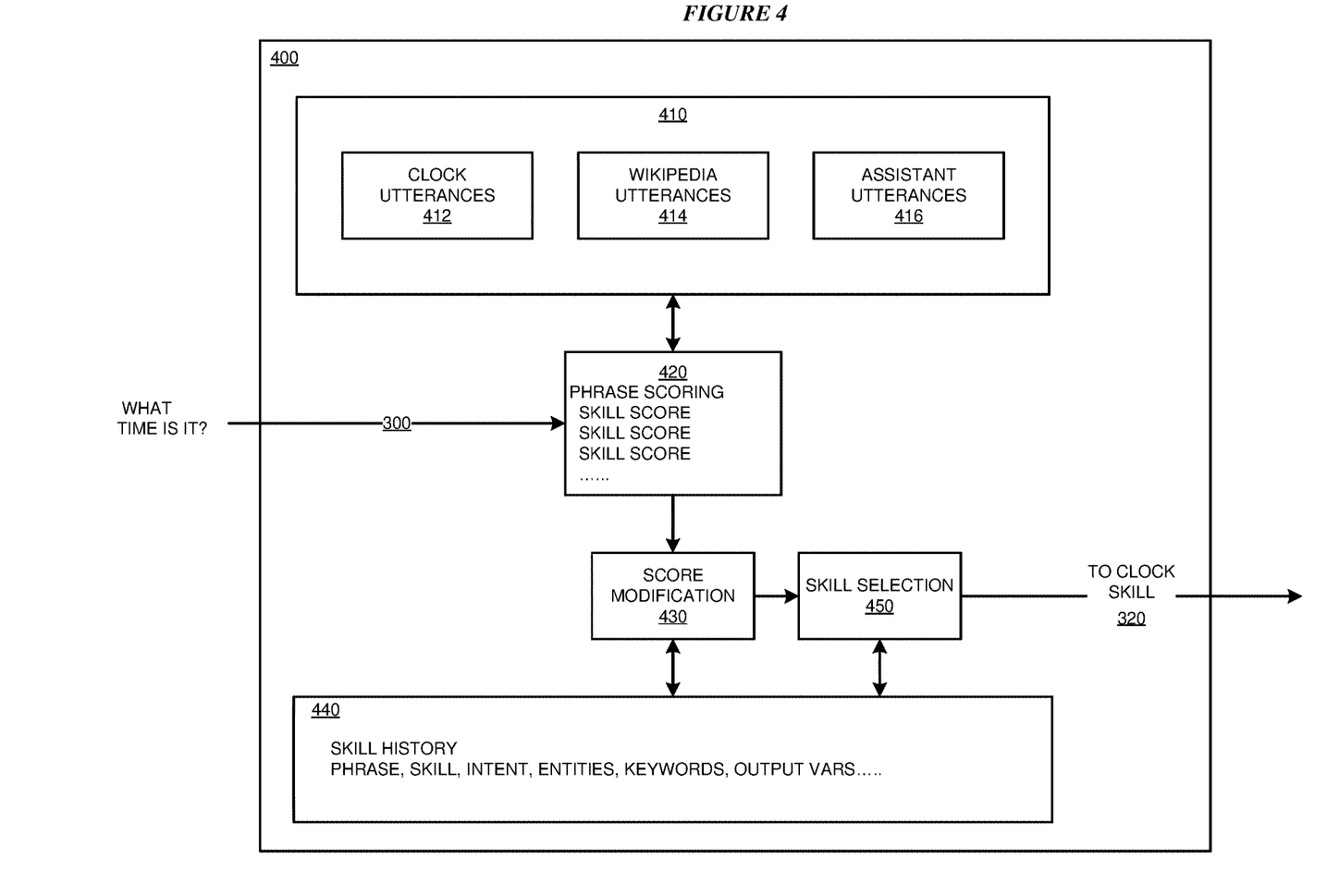
FIG. 4 depicts a block diagram of a skill assistant application, in accordance with an illustrative embodiment.

FIG. 4 depicts a block diagram of skill assistant application 300, in accordance with an illustrative embodiment. Skill assistant application 300 is the same as skill assistant application 300 in FIG. 3. Here, storage module 410 stores installed skill utterances. In particular, FIG. 4 depicts three sets of installed skill utterances: skill module 412 stores clock utterances, skill module 414 stores reference repository utterances, and skill module 416 stores utterances relating to a default installed skill. Those of ordinary skill in the art will appreciate that more or fewer skill modules are possible within the scope of the illustrative embodiments. In addition, a skill module may store one or more sets of skill utterances.

FIG. 4 also depicts phrase scoring module 420. When skill assistant application 300 receives an utterance, the utterance is routed to phrase scoring module 420. Phrase scoring module references skill modules 412, 414, and 416 stored in storage module 410 to produce a list of skills and corresponding scores. The list of skills and corresponding scores represent skills that could correspond to the user's utterance and the likelihood that each skill corresponds to the user's desire.

FIG. 4 also depicts score modification module 430 and skill history module 440. Score modification module 430 receives raw skills and scores from phrase scoring module 420 and modifies the scores. For example, scores may be modified based on the locations of saved skills in a skill history stored in skill history module 440. FIG. 4 also depicts skill selection module 450, which receives modified scores from score modification module 430 and selects an appropriate skill to route the utterance to. In selecting an appropriate skill, skill selection module 450 may optionally reference the saved skills in a skill history stored in skill history module 440. For example, skill assistant application 300 routes the phrase "What time is it?" (discussed with reference to FIG. 3) to skill 320, the clock skill, which is configured to handle time-related tasks.

Figure 5:
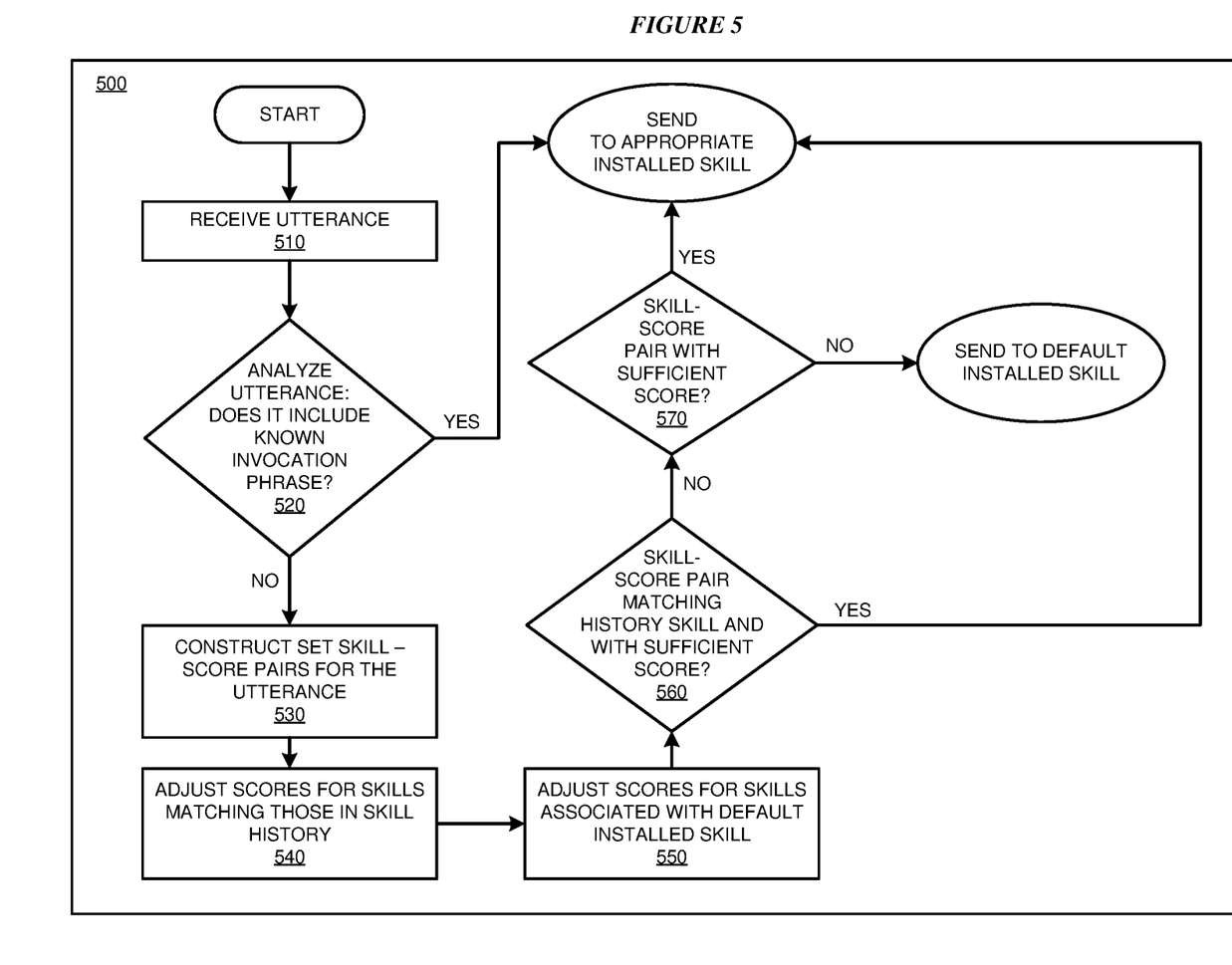
FIG. 5 depicts a flowchart of an example application for automatic skill routing in a conversational framework in accordance with an illustrative embodiment.

With reference to FIG. 5, this figure depicts a flowchart of an example application 500 for automatic skill routing in a conversational framework in accordance with an illustrative embodiment. Application 500 can be implemented in skill assistant application 300 in FIG. 3 or FIG. 4.

Application 500 begins with block 510, which receives an utterance. Next, in block 520, application 500 analyzes the utterance to determine if the utterance includes a known invocation phrase and, if so ("Yes" path of block 520), routes the utterance directly to an appropriate installed skill for handling. Otherwise ("No" path of block 520), in block 530, application 500 constructs a set of skills and corresponding scores. Each skill-score pair in the set denotes a skill that could correspond to the user's utterance and the likelihood that that skill does indeed correspond to the user's utterance.

Once the set of skill-score pairs has been constructed, scores are adjusted. In block 540, application 500 adjusts scores for skills that match skills in the skill history. In block 550, application 500 adjusts scores for skills associated with a default installed skill.

After any appropriate score adjustment, the application selects a skill-score pair corresponding to an installed skill. In block 560, application 500 checks for a skill in a skill-score pair matching a skill stored in the skill history and with a score above a threshold. If one is found ("Yes" path of block 560), application 500 selects that skill. If none is found ("No" path of block 560), in block 570 application 500 checks that the skill-score pair with the highest score also has a score above a threshold. If one is found ("Yes" path of block 570), application 500 selects that skill. If none is found ("No" path of block 570), application 500 selects the default installed skill.

Once an installed skill is selected, application 500 routes the utterance to that skill for handling. The selected installed skill's conversation engine maps the user's phrase to an intent, optional slot(s), and action, then calls appropriate action code.

Thus, a computer implemented method, system or apparatus, and computer program product are provided in the illustrative embodiments for automatic skill routing in conversational computing frameworks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
analyzing an utterance to identify an absence of a known invocation phrase;
constructing, in response to the absence, using a processor and a memory, a skill set, the skill set including a first skill corresponding to the utterance and a first skill score corresponding to a likelihood that the first skill corresponds to the utterance;
adjusting, based on the presence of the first skill in a skill history, the first skill score, wherein the skill history stores a set of history skills in an order of recency of use of each history skill in the set of history skills;
further adjusting, based on an association of the first skill with a default installed skill, the adjusted first skill score; and
selecting, based on the further adjusted first skill score, an installed skill, wherein the installed skill performs an action in response to the utterance.

2. The method of claim 1, wherein the adjusting, based on the presence of the first skill in a skill history, further comprises:
determining that the first skill matches a history skill associated with an installed skill other than the default installed skill; and
raising, responsive to the determining, the first skill score.

3. The method of claim 2, further comprising raising the first skill score by an amount corresponding to a location of the history skill in the skill history.

4. The method of claim 1, wherein the further adjusting, based on an association of the first skill with a default installed skill, further comprises:
determining that the first skill is associated with the default installed skill; and
raising, responsive to the determining, the adjusted first skill score.

5. The method of claim 1, wherein selecting an installed skill further comprises selecting, responsive to determining that the first skill matches a history skill and that the first skill score is above a threshold, an installed skill corresponding to the history skill.

6. The method of claim 1, wherein selecting an installed skill further comprises selecting, responsive to determining that the first skill does not match a history skill and that the first skill score is above a threshold, an installed skill corresponding to the first skill.

7. The method of claim 1, wherein selecting an installed skill further comprises selecting, responsive to determining that the first skill does not match a history skill and that the first skill score is not above a threshold, the default installed skill.

8. A computer usable program product comprising one or more computer-readable storage devices, and program instructions stored on at least one of the one or more storage devices, the stored program instructions comprising:
program instructions to analyze an utterance to identify an absence of a known invocation phrase;
program instructions to construct, in response to the absence, using a processor and a memory, a skill set, the skill set including a first skill corresponding to the utterance and a first skill score corresponding to a likelihood that the first skill corresponds to the utterance;
program instructions to adjust, based on the presence of the first skill in a skill history, the first skill score, wherein the skill history stores a set of history skills in order of recency of use of each history skill in the set of history skills;
program instructions to further adjust, based on an association of the first skill with a default installed skill, the adjusted first skill score; and
program instructions to select, based on the further adjusted first skill score, an installed skill, wherein the installed skill performs an action in response to the utterance.

9. The computer usable program product of claim 8, wherein program instructions to adjust, based on the presence of the first skill in a skill history, further comprises:
program instructions to determine that the first skill matches a history skill associated with an installed skill other than the default installed skill; and
program instructions to raise, responsive to the determining, the first skill score.

10. The computer usable program product of claim 8, further comprising program instructions to raise the first skill score by an amount corresponding to a location of the history skill in the skill history.

11. The computer usable program product of claim 8, wherein program instructions to further adjust, based on an association of the first skill with a default installed skill, further comprises:
program instructions to determine that the first skill is associated with the default installed skill; and
program instructions to raise, responsive to the determining, the adjusted first skill score.

12. The computer usable program product of claim 8, wherein program instructions to select an installed skill further comprises program instructions to select, responsive to determining that the first skill matches a history skill and that the first skill score is above a threshold, an installed skill corresponding to the history skill.

13. The computer usable program product of claim 8, wherein program instructions to select an installed skill further comprises program instructions to select, responsive to determining that the first skill does not match a history skill and that the first skill score is above a threshold, an installed skill corresponding to the first skill.

14. The computer usable program product of claim 8, wherein program instructions to select an installed skill further comprises program instructions to select, responsive to determining that the first skill does not match a history skill and that the first skill score is not above a threshold, the default installed skill.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via, at least one of the one or more memories, the stored program instructions comprising:
 program instructions to analyze an utterance to identify an absence of a known invocation phrase;
 program instructions to construct, in response to the absence, using a processor and a memory, a skill set, the skill set including a first skill corresponding to the utterance and a first skill score corresponding to a likelihood that the first skill corresponds to the utterance;
 program instructions to adjust, based on the presence of the first skill in a skill history, the first skill score, Wherein the skill history stores a set of history skills in order of recency of use of each history skill in the set of history skills;
 program instructions to further adjust, based on an association of the first skill with a default installed skill, the adjusted first skill score; and
 program instructions to select, based on the further adjusted first skill score, an installed skill, wherein the installed skill performs an action in response to the utterance.

18. The computer system of claim 17, wherein program instructions to adjust, based on the presence of the first skill in a skill history, further comprises:
 program instructions to determine that the first skill matches a history skill associated with an installed skill other than the default installed skill; and
 program instructions to raise, responsive to the determining, the first skill score.

19. The computer system of claim 17, further comprising program instructions to raise the first skill score by an amount corresponding to a location of the history skill in the skill history.

20. The computer system of claim 17, wherein program, instructions to further adjust, based on an association of the first skill, with a default installed skill, further comprises:
 program instructions to determine that the first skill is associated with the default installed skill; and
 program instructions to raise, responsive to the determining, the adjusted first skill score.

\* \* \* \* \*